United States Patent Office 3,147,869
Patented Sept. 8, 1964

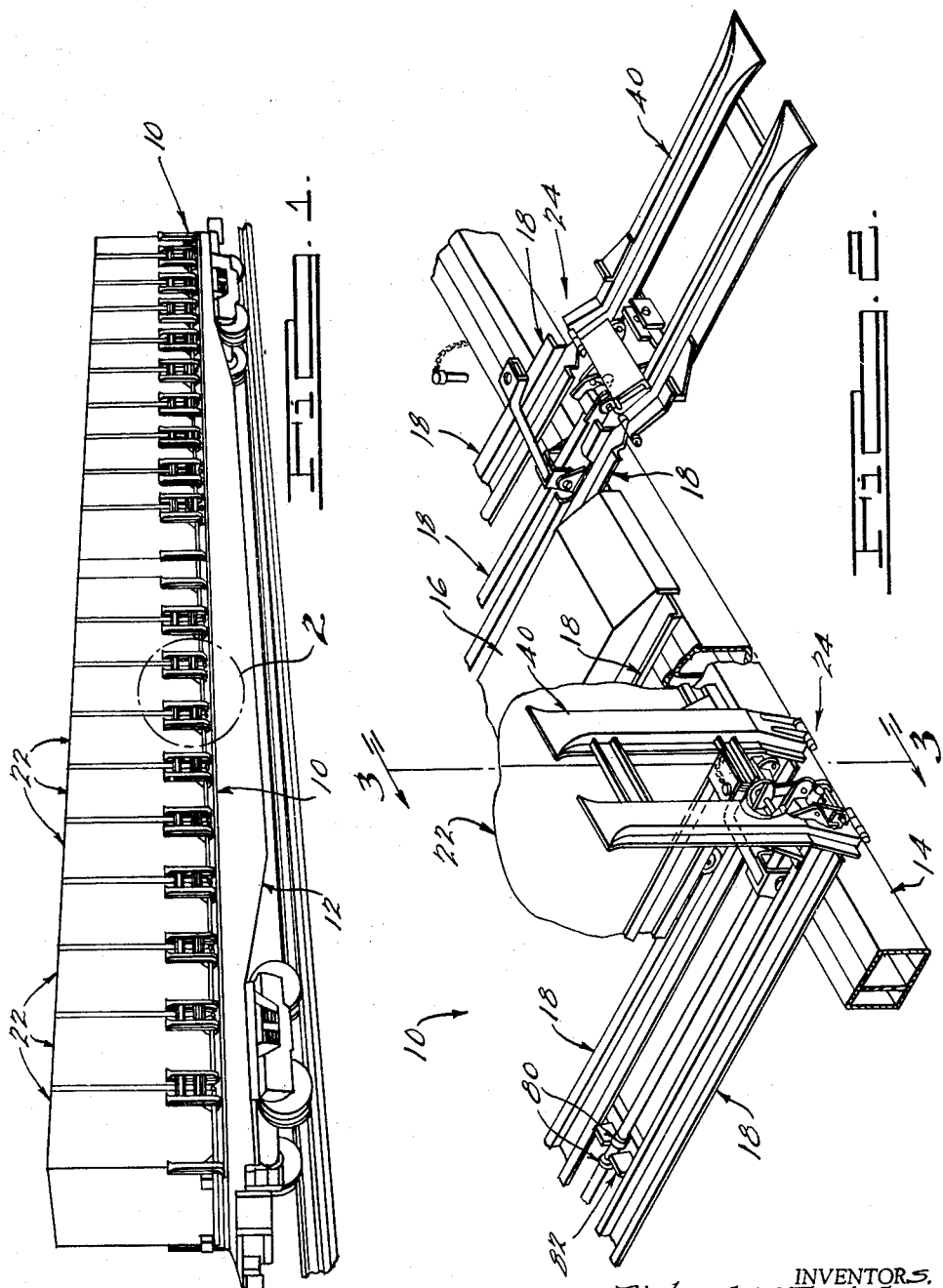

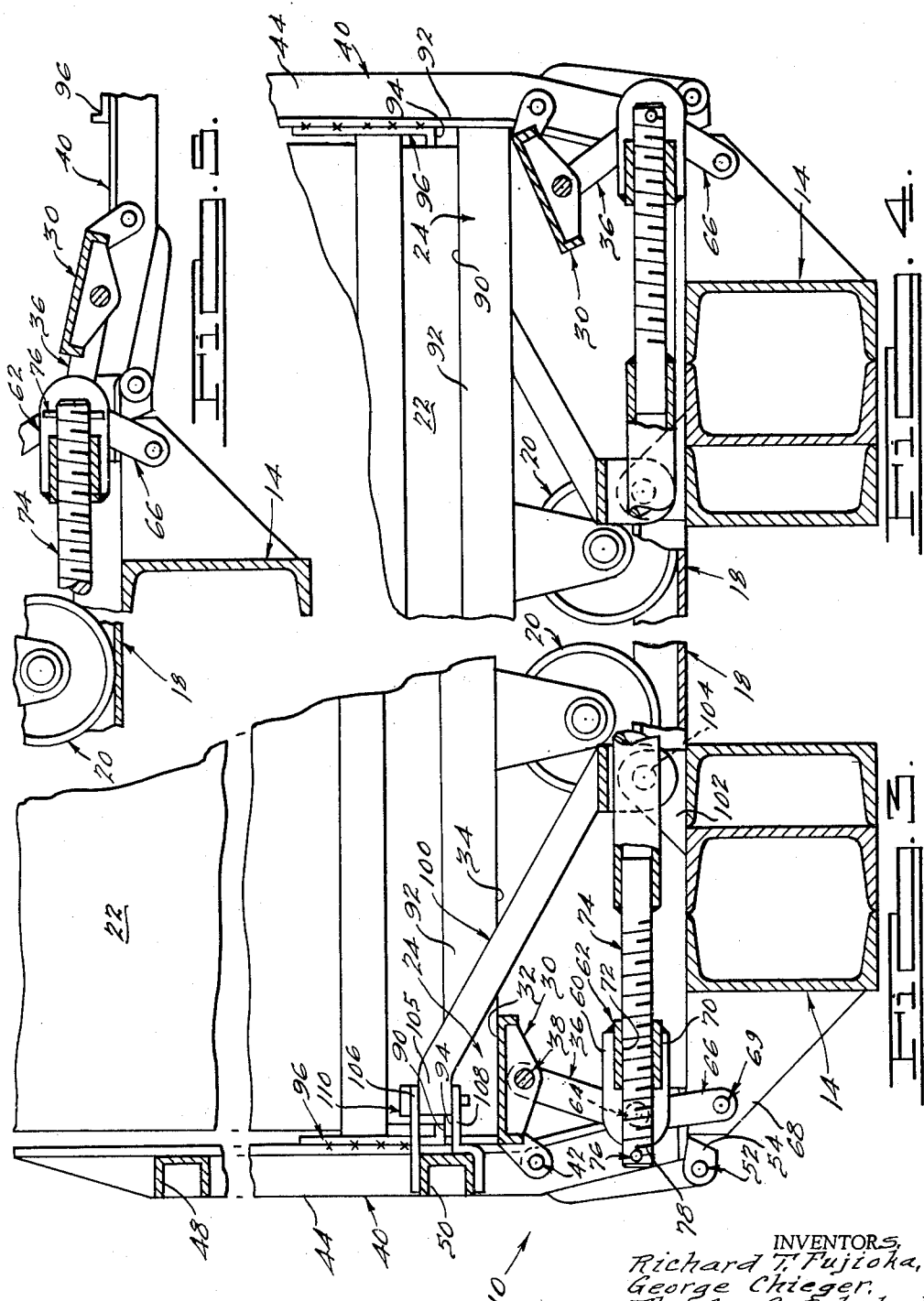

3,147,869
CONTAINER FRAME
Richard T. Fujioka, Oxford, George Chieger, Grosse Pointe Woods, and Theodor C. Schubach, Detroit, Mich., assignors to Fruehauf Corporation, a corporation of Michigan
Filed Dec. 31, 1962, Ser. No. 248,479
4 Claims. (Cl. 214—85)

This invention relates generally to freight handling apparatus and more particularly to an improved frame for shipping containers.

There are many advantages to shipping freight or packaged goods in containers of modular dimensions. For example, standardized equipment can be provided for handling, the cubic volume of the container is known, which facilitates loading and, when loaded, such containers are relatively easily spotted and stacked on, for example, a wheeled vehicle or ship.

One obvious problem associated with the use of such shipping containers is that they are relatively large and, in the absence of some form of handling aid, are relatively difficult to handle. This problem has been solved, in part, by providing the containers with rollers to facilitate movement thereof about, for example, a loading dock and between the loading dock and a vehicle.

However, the use of such rollers, which solves one problem, creates another in that it is undesirable to ship the containers with the weight thereof resting on the rollers because the constant shaking and abuse to which such containers are normally subjected while in transit or, for example, when railway cars are humped during assembly of a train, would soon render the rollers inoperative. In addition, as long as the containers are supported on rollers, they are relatively easily movable and therefore are difficult to tie down securely for the purpose of shipment.

The foregoing problems associated with the shipment of roller-mounted containers, as well as the problem of transferring such containers between, for example, a shipping dock and a rail car or other vehicle, is solved in accordance with the present invention.

The frame features a novel ramp construction that facilitates movement of the containers from, for example, a loading dock onto the frame. The containers are elevatable by a novel platform and toggle system to a position wherein the weight of the containers is relieved from the rollers thereof.

The frame itself is of such a dimension and construction that it accepts a plurality of the shipping containers, yet is readily acceptable upon conventional railway flat cars, trailers or the like.

Accordingly, one object is an improved supporting and carrying frame for freight containers.

Another object is a supporting frame for freight containers having rollers on the bottom thereof that remove the weight of the containers from the rollers during shipment.

Another object is a frame for freight containers having a foldable ramp to facilitate loading of the containers on the frame.

Other objects and advantages of the present invention will be apparent in the following specification, claims and drawings wherein:

FIGURE 1 is a perspective view of a container frame for freight containers shown in association with a flat bed railway car having a plurality of freight containers operatively mounted thereon;

FIG. 2 is an enlarged fragmentary view taken substantially within the circle 2 of FIGURE 1 with one ramp section lowered to the container-accepting condition;

FIG. 3 is a cross-sectional view taken substantially along the line 3—3 of FIG. 2 with the container in an elevated condition;

FIG. 4 is a view similar to FIG. 3 with the elevator platform and container in a lowered condition; and FIG. 5 is a view similar to FIG. 4 with the ramp lowered to facilitate discharge of the container.

A supporting and carrying frame 10, in accordance with an exemplary constructed embodiment of the present invention, is shown in operative association with a conventional flat bed railway car 12. The frame 10 is secured to the railway car 12 by any suitable means, for example, hold-down bolts (not shown).

The frame 10 comprises a pair of spaced built-up longitudinal frame members 14 that are joined by a plurality of lateral frame members 16. A plurality of trackways 18 of generally upwardly opening U-shaped configuration extend laterally between the longitudinal frame members 14 for the acceptance of the wheels 20 of a plurality of shipping containers 22.

The frame 10 is adapted to accommodate any desired number of shipping containers 22, the disclosed exemplary embodiment of the frame 10 having provision for the acceptance and support of ten such containers 22, two of the frames 10 being carried by the single railway car 12.

As best seen in FIGS. 2 and 3, a pair of spaced elevator assemblies, generally designated by the numeral 24, are disposed between and at opposite ends of the trackways 18. The elevator assemblies 24 effect elevation of the containers 22 to relieve the weight thereof from the rollers 20. The elevator assemblies at opposite ends of the trackways 18 are identical in construction, only one of which will be described in detail, for the purpose of clarity.

As best seen in FIG. 3 of the drawings, each elevator assembly 24 comprises a platform 30, an upper surface 32 of which is engageable with a lower surface 34 of the container 22. The platform 30 is supported in part by an upper toggle member 36 being pivotally connected thereto by a pin 38. The platform 30 is also pivotally coupled to a ramp 40 as by a pin 42.

The ramp 40 comprises a pair of generally U-shaped channels 44 (FIG. 2) that are laterally aligned with adjacent trackways 18. The ramp channels 44 are joined to form a rigid unit by a pair of transversely extending tie members 48 and 50. The ramp 40 is supported for rotation relative to the frame member 14 by a pair of pins 52 that extend through the ramp channels 44 and through a pair of downwardly extending flanges 54 on the trackways 18.

The upper toggle member 36 is pivotally coupled to a leg portion 60 of a generally U-shaped yoke 62 as by a pin 64. A lower toggle member 66 is also coupled to the leg portion 60 of the yoke 62 by the pin 64 and to a flange 68 on the frame member 14 as by a pin 69. It is to be noted that like toggle members 36 and 66 are provided on each side of the yoke 62.

The bight portion of the yoke member 62 comprises a nut 70 having a threaded internal bore 72 for the acceptance of a complementary threaded shaft 74. The shaft 74 has a pin 76 at an outer end 78 thereof for the acceptance of a conventional crank (not shown). The shaft 74 extends laterally of the frame 10 between the trackways 18 and is coupled to an elevator assembly 24 at the other end thereof. The trackway is stabilized against excessive axial movement by suitable collars 80 (FIG. 2) that are engageable with complementary fixed flanges 82 between the trackways 18. It is to be noted, however, that the shaft 74 is vertically movable relative to the trackways 18.

The platform 30 of the elevator assembly 24 is elevatable upon advancement of the yoke 62 axially inwardly of the shaft 74 upon rotation of the shaft 74. As the platform 30 moves upwardly due to the toggle action of the upper and lower toggle members 36 and 66, respectively, it biases the container 22 upwardly until, as best seen in FIG. 3 of the drawings, an upper edge face 90 of a peripheral rib 92 on the container 22 engages a lower edge face 94 of an L-shaped bracket 96 or the ramp member 44. Thus, it will be seen that the weight of the container 22 is relieved from the rollers 26 when the container is pinched or locked in the upper condition.

The ramp 40 is lockable in the upright condition so as to position the bracket 96 thereon for engagement with the upper edge face 90 of the peripheral rib 92 by an angularly upwardly extending arm 100 that is pivotally secured to a bracket 102 on the frame member 14 as by a pin 104. An upper end portion 105 of the arm 100 is accepted between a pair of flanges 106 and 108 on the ramp 40, a pin 110 being insertable therethrough to secure the ramp 40 in the vertical condition.

As best seen in FIG. 4, the geometry of the pivot points of the toggle members 36 and 66 which support the platform 30 of the elevator assembly 24 is such that the platform 30 can be lowered to the condition shown in FIG. 4 with the ramp 40 in the vertical condition by retracting the yoke 62 axially outwardly of the screw shaft 74, which movement lowers the container 22 until the wheel 20 accepts the weight thereof. Thereafter, as best seen in FIG. 5, one or both of the ramps 40 can be lowered for the discharge of the container 22 from either side of the frame 10.

From the foregoing description, it should be apparent that the container frame of the present invention includes a platform that effects elevation of a container to transfer the weight thereof from the rollers through a relatively simple mechanical linkage that affords a relatively great mechanical advantage. The container is pinched in an elevated condition for shipment. The ramp for the container is easily rotated between a loading and unloading condition. The ramps can be lowered selectively when a rail facility permits access to only one side of the container frame.

It is to be understood that the specific construction of the improved container frame herein disclosed and described is presented for the purpose of explanation and illustration and is not intended to indicate limits of the invention, the scope of which is defined by the following claims.

We claim:

1. A frame for a freight container having a plurality of rollers depending therefrom, said frame comprising
    a plurality of trackways for the acceptance of the rollers of the container,
    a ramp foldable between a generally horizontal loading condition and a generally vertical shipping condition,
    means for securing said ramp in the vertical shipping condition,
    a stop on said ramp engageable with the container when said ramp is in a vertical shipping condition, and
    an elevator for moving the container vertically to a shipping condition against said stop thereby to secure the container for shipment and to relieve the weight thereof from the rollers.

2. A frame for a freight container having a plurality of rollers depending therefrom, said frame comprising
    a plurality of trackways for the acceptance of the rollers of the container,
    a ramp having a pair of tracks in alignment with said trackways and foldable between a generally horizontal loading condition and a generally vertical shipping condition,
    means for securing said ramp in the vertical shipping condition,
    a stop on said ramp engageable with the container when said ramp is in a vertical shipping condition,
    a platform movable vertically into engagement with the container, and
    a toggle system for moving said platform and container vertically to a shipping condition against said stop thereby to secure the container for shipment and to relieve the weight thereof from the rollers.

3. A frame for a freight container having a plurality of rollers depending therefrom, said frame comprising
    a plurality of trackways for the acceptance of the rollers of the container,
    a pair of ramps on opposite sides of said frame having tracks, respectively, aligned with said trackways and foldable between a generally horizontal loading condition and a generally vertical shipping condition,
    means for securing said ramps in the vertical shipping condition, a pair of stops on said ramps, respectively, engageable with opposite sides of the container when said ramps are in a vertical shipping condition,
    a pair of platforms on opposite sides of said frame movable vertically into engagement with the container, and
    a pair of toggle systems on opposite sides of said frame for moving said platforms and container vertically to a shipping condition against said stops, said toggle systems comprising
    a rod extending generally parallel to said trackways having oppositely threaded end portions,
    a pair of nuts threadably engaged with the opposite ends of said rod,
    a pair of upper toggle links pivotally connected to said nuts and to said platforms, respectively, and
    a pair of lower toggle links connected to said nuts and to opposite sides of said frame whereby rotation of said rod effects advancement of said nuts toward one another and elevation of said platforms thereby to bias the container upwardly against said stops to relieve the weight thereof from the rollers.

4. A frame for a freight container having a plurality of rollers depending therefrom, said frame comprising
    a plurality of trackways for the acceptance of the rollers of the container,
    a pair of ramps on opposite sides of said frame having tracks, respectively, aligned with said trackways and foldable between a generally horizontal loading condition and a generally vertical shipping condition,
    means for securing said ramps in the vertical shipping condition, a pair of stops on said ramps, respectively, engageable with opposite sides of the container when said ramps are in a vertical shipping condition,
    a pair of platforms on opposite sides of said frame movable vertically into engagement with the container, and
    a pair of toggle systems on opposite sides of said frame for moving said platforms and container vertically to a shipping condition against said stops, said toggle systems comprising
    a rod extending generally parallel to said trackways having oppositely threaded end portions,
    a pair of nuts threadably engaged with the opposite ends of said rod, a pair of upper toggle links pivotally connected to said nuts and to said platforms, respectively, a pair of lower toggle links connected to said nuts and to opposite sides of said frame whereby rotation of said rod in one direction effects advancement of said nuts toward one another and elevation of said platforms to bias the container upwardly against said stops and relieve the weight thereof from the rollers and rotation of said rod in the other direction effects movement of said nuts away from one another to lower said platforms, respectively, and a pair of links pivotally coupled to said platforms and said ramps, respectively, whereby said platforms are foldable with said ramps to the unloading condition.

References Cited in the file of this patent

UNITED STATES PATENTS

| | | |
|---|---|---|
| 2,021,503 | Fildes | Nov. 19, 1935 |
| 2,033,119 | Bennett | Mar. 10, 1936 |
| 2,714,967 | Olsen | Aug. 9, 1955 |
| 3,058,603 | Tantlinger et al. | Oct. 16, 1962 |
| 3,095,989 | Morrison | July 2, 1963 |